United States Patent [19]
Ohashi et al.

[11] Patent Number: 4,939,044
[45] Date of Patent: Jul. 3, 1990

[54] ALUMINUM ALLOY SUPPORT FOR LITHOGRAPHIC PRINTING PLATE

[75] Inventors: Azusa Ohashi, Shizuoka; Akira Shirai, Shizuoka; Kazushige Takizawa, Shizuoka; Shiro Terai, Aichi; Shin Tsuchida, Aichi; Yoshikatsu Hayashi, Aichi, all of Japan

[73] Assignees: Fuji Photo Film Co., Ltd.; Sumitomo Light Metal Industries, Ltd., both of Japan

[21] Appl. No.: 745,976

[22] Filed: Jun. 18, 1985

Related U.S. Application Data

[63] Continuation-in-part of Ser. No. 648,348, Sep. 7, 1984, abandoned, which is a continuation of Ser. No. 385,941, Jun. 7, 1982, abandoned.

[30] Foreign Application Priority Data

Jun. 5, 1981 [JP] Japan ................................. 56-86460

[51] Int. Cl.$^5$ ............................................. B41N 1/08
[52] U.S. Cl. ................................... 428/654; 148/437; 101/459
[58] Field of Search ....................... 428/654; 148/437; 101/459

[56] References Cited

U.S. PATENT DOCUMENTS

| | | | |
|---|---|---|---|
| 1,224,362 | 5/1917 | Cooper | 420/528 |
| 3,217,641 | 11/1965 | Goffredo | 101/401.1 |
| 3,330,743 | 7/1967 | Jestl | 101/459 |
| 3,648,607 | 3/1972 | Gundluch | 101/450.1 |
| 3,717,915 | 2/1973 | Teubler | 101/459 |
| 3,728,108 | 4/1973 | Sifferlen | 420/528 |
| 3,788,956 | 1/1974 | Patrie et al. | 204/35 H |
| 3,795,590 | 3/1974 | Patrie | 204/35 H |
| 3,798,137 | 3/1974 | Kampert | 204/35 H |
| 3,989,548 | 11/1976 | Morris | 148/2 |
| 4,092,925 | 6/1978 | Fromson | 101/401.1 |

FOREIGN PATENT DOCUMENTS

| | | | |
|---|---|---|---|
| 12928 | 4/1973 | Japan | 101/459 |
| 29301 | 3/1977 | Japan | 101/459 |
| 490421 | 8/1938 | United Kingdom | 420/528 |
| 142710 | 1/1976 | United Kingdom | 101/459 |
| 1547040 | 6/1979 | United Kingdom | 101/459 |

Primary Examiner—Clifford D. Crowder
Attorney, Agent, or Firm—Sughrue, Mion, Zinn, Macpeak & Seas

[57] ABSTRACT

An aluminum alloy support for a lithographic printing plate, comprising a cold rolled plate of aluminum alloy comprising, in % by weight:

98.0% or more Al;

Fe in an amount of from 0.15 to 1.2% as an alloying element; and impurities, each of which is present in an amount of from 0.0% but less than or equal to 0.15%, wherein the cold rolled plate has a distribution of Al—Fe and Al—Fe—Si based intermetallic compounds formed from the alloy, having grain sizes of greater than 0 microns but less than or equal to 3 microns, which are positioned directly under an outer surface of the cold rolled plate and wherein the surface of the cold rolled plate is roughened by etching or electrochemical etching and anodically oxidized.

6 Claims, No Drawings

ALUMINUM ALLOY SUPPORT FOR LITHOGRAPHIC PRINTING PLATE

CROSS REFERENCE TO THE RELATED APPLICATION

This application is a continuation-in-part application of U.S. patent application Ser. No. 648,348, filed Sept. 7, 1984, now abandoned, which is the continuation application of U.S. patent application Ser. No. 385,941, filed June 7, 1982, now abandoned.

FIELD OF THE INVENTION

The present invention relates to a support for a printing plate comprised of aluminum alloy(s). The support is provided with the necessary characteristics by application of anodic oxidation onto the roughened surface thereof, has excellent mechanical strength and printability, and is advantageous from an economic standpoint.

BACKGROUND OF THE INVENTION

Lithographic printing plates which are now generally used are obtained by submitting so-called presensitized printing plates (hereinafter referred to as "PS plates") to plate making processing. The PS plates are prepared by coating light-sensitive materials on aluminum plates having surfaces subjected to surface treatments, e.g., a graining treatment, an oxidizing treatment, and so on, and drying them. The plate making process includes an imagewise exposing step, a developing step, a step of washing with water, a step of treating with lacquer and so on. It is well known that the areas where the light-sensitive layer remains undissolved after the above-described developing step form the image part and the areas where the light-sensitive layer is removed to expose the underlying aluminum surface become water-acceptable. Accordingly, such water-acceptable portions form the non-image part.

Aluminum plates are generally used as the supports of such lithographic printing plates. Conventional materials used for this purpose are prepared from aluminum alloy plates produced by casting aluminum alloys, e.g., JIS A3003, JIS A1100, JIS A1050, etc., into ingots using a conventional continuous casting process. The ingots are then submitted to a hot rolling process and a cold rolling process and optionally a heat treatment at an intermediate stage during the rolling processes. The thus-prepared aluminum alloy plates are then subjected to a surface roughening treatment using a mechanical, chemical or electrochemical technique and subsequently to an anodic oxidation.

More specifically, in accordance with known methods, aluminum plates are subjected in sequence to a mechanical roughening treatment, a chemical etching treatment and anodically oxidized film forming processing, as described in U.S. Pat. No. 3,834,998. According to another process, plates are subjected to a chemical etching treatment and subsequently to anodically oxidized film forming processing, as described in Japanese Patent Application (OPI) No. 61304/76 (the term "OPI" as used herein refers to a "published unexamined Japanese patent application"). In another process, aluminum plates are subjected in sequence to an electrochemical treatment, an after-treatment and anodically oxidized film forming processing, as described in Japanese Patent Application (OPI) No. 146234/79. In yet another process, aluminum plates are subjected in sequence to an electrochemical treatment, a chemical etching treatment and anodically oxidized film forming processing, as described in Japanese Patent Publication No. 28123/73. In still another process, aluminum plates are subjected to a mechanical roughening treatment and subsequently to the treatments described in Japanese Patent Publication No. 28123/73.

However, the use of conventional aluminum alloy plates may generate dot-form defects upon both the chemical etching and the electrochemical etching treatment causing stain in prints obtained. Accordingly, they have turned out to be disadvantageous with respect to obtaining high print quality.

In recent times, printing speeds have been increased. Accordingly, this causes an increase in the stress applied to the printing plate which is fixed mechanically at both ends of a rotating cylinder installed in a printing machine. When put under such stress, aluminum alloy plates often have insufficient mechanical strengths. Accordingly, deformation or breaks of the printing plate at the above-described fixed parts result. A breakdown of the printing plate makes it impossible to continue the printing operation.

Previously, relatively thick aluminum alloy plates had to be employed to ensure sufficient mechanical strength such as dimensional stability. The need for thicker plates was a major factor increasing manufacturing costs of lithographic printing plates.

SUMMARY OF THE INVENTION

A primary object of the present invention is to provide an aluminum alloy support for a printing plate which furnishes a simultaneous solution of the above-described three problems. More specifically, the invention solves the problem of printability, the problem of insufficiency in mechanical strength and the economic problem. Therefore, it is the primary object of the present invention to provide an aluminum alloy support for a printing plate which is produced at a low cost and has both high printability and mechanical strength which is high enough to be suitable for high speed printing.

The present inventors have carefully studied dot-form stain which tends to be observed on printed matter when aluminum alloy plates prepared by using conventional aluminum alloys are used. Such plates may be comprised of JIS A1100 (the purity of aluminum: 99.0%), JIS A1200 (the purity of aluminum: 99.0%), and JIS A3003 (the purity of aluminum: 98.0–98.5%). The plates are prepared by subjecting them to a chemical or electrochemical etching treatment. As a result of these studies the present inventors have confirmed that the dot-form stain is caused by dot-form defects present at the surface of the support. The dot-form defects results from coarse grains of certain intermetallic compounds distributed in the aluminum alloy plate before these plates receive surface treatments.

More specifically, the $Al_6Mn$ compound in the case of the aluminum alloy JIS A3003, and Al-Fe base compounds such as $Al_3Fe$ and $Al_6Fe$ in the case of the pure aluminum series alloys like JIS A1100 and JIS A1200 are necessarily crystallized out in the form of grains several tens of microns in size upon solidification in the casting process. The thus-formed grains are crushed to some degree in subsequently carried out rolling and cold rolling processes. However, grains which remain about 5 to 10 microns in size are still distributed even in the final rolled plates. These grains are dissolved and dropped away in the form of a lump during roughening due to the surface treatments, and holes measuring 10 microns or larger in size are left. During actual printing, ink is captured in these holes which creates stains on the prints.

In view of their limited workability, which is determined by the thickness of the ingot and the thickness of the final plate, as well as the fact that these compounds are quite stable to heat and decomposed by heat with difficulty, it is almost impossible to finely divide or eliminate grains of the intermediate compounds by only rolling processes and heat treatment given at an intermediate stage during the rolling processes.

The present invention relates to preventing dot-form defects from occurring in an aluminum alloy support for a printing plate. This result is attained by using an aluminum alloy having particular chemical constituents. The desired alloy is obtained by quenching an aluminum alloy upon solidification with such a speed that its intermetallic compounds may be crystallized out in the form of very fine grains of 3 $\mu$m or less. This alloy is used to prepare an aluminum alloy support for a printing plate having excellent printability by using a material which prevents dot-form defects from occurring. The invention provides an aluminum alloy support for a printing plate excellent in not only printability but also mechanical strength and economic efficiency. The plate is produced by uniting the material which is very suitable for the above-described use with a regenerated aluminum base plate which is available at a low price and has high mechanical strength.

DETAILED DESCRIPTION OF THE INVENTION

The alloy can be produced so that the intermetallic compounds are distributed in the outer layer material in the form of very fine grains by solidifying the aluminum alloy from the molten state through quenching at a rate of 50° C./sec or more. If the aluminum alloy used contains not less than 1.2% of Fe, undesirable results are obtained. This is because coarse grains may be crystallized out by solidification even when employing a quenching condition as described above and clusters of grains larger than 3 microns in size are still present in the rolled plate.

When 1.2% or less Fe is present in the aluminum alloy, a large portion of Fe, which is formed into a solid solution by the quenching solidification, is crystallized out as Al—Fe—Si based fine grains having a grain size of 0.1 micron or less and homogenously distributed in the alloy by a hot rolling process and heat treatment which is carried out during cold rolling processings. A small portion of Fe, which is crystallized out upon the quenching solidification and has a grain size of 5 microns or less, is crushed by the rolling processes and distributed as grains having a grain size of smaller than 3 microns inside the final rolled plate.

These fine grains of Fe compounds are preferentially dissolved and eliminated by a chemical roughening treatment or an electrochemical roughening treatment. These grains contributes to the formation of a finely roughened surface structure due to their small grain sizes.

The strength characteristics of composite aluminum alloy plates of the present invention and aluminum alloys to be employed as core material will be described in detail below.

The strength of the composite plate, $\sigma$, can be represented by the following equation:

$$\sigma = \sigma_f f + \sigma_c (1-f)$$

wherein $\sigma_f$ of is the strength of an outer layer material, f is a fraction representing the thickness of the outer layer with respect to the total thickness of the composite plate, and $\sigma_c$ is the strength of a core material. Accordingly, the thickness sharing in the composite plate is designed depending upon the strength of an aluminum material to be used as its core material and the strength $\sigma_f$ of an aluminum material to be used as its outer layer. By considering these factors, the thickness of the outer layer material fitted to receive roughening treatments is determined. However, since the composite plate is etched in its thickness direction, it is necessary for the outer layer to have a thickness of at least 10 microns, preferably 10 to 100 microns.

The thickness of the core material ranges from 80 to 500 microns, preferably 80 to 300 microns.

Core materials which can be employed include aluminum alloys which can acquire mechanical strengths higher than those of materials for the outer layer when they receive a cold rolling process under the same condition. More specifically, it is possible to use various aluminum alloys capable of exhibiting stress resistance not lower than 15 kg/mm$^2$ after they received a cold rolling process at rolling rate of 40% or more. Specific examples of such aluminum alloys include JIS A1100 (which has a stress resistance of 15.0 to 16.5 kg/mm$^2$), JIS A1200 (which has a stress resistance of 15.0 to 16.5 kg/mm$^2$), JIS A3003 (which has a stress resistance of 15.0 to 22.0 kg/mm$^2$), JIS A3004 (which has a stress resistance of 20.0 to 27.0 kg/mm$^2$), JIS A5052 (which has a stress resistance of 22.0 to 29.0 kg/mm$^2$), and so on. However, when aluminum alloys containing 0.5% or more of Fe are employed as the outer layer material, it is advantageous to use alloys of the kind which can readily acquire stress resistances of 20 kg/mm$^2$ or higher, such as JIS A3003, JIS A3004, JIS A5052, and so on.

The use of these aluminum alloys increases manufacturing costs. The increased costs are brought about because they require chemical constituents which must be closely controlled during the manufacturing process. The present invention involves the use of such aluminum alloys which have purities of 99 to 95% but which do not receive particular controls with respect to their chemical constituents. Specific examples of aluminum alloys which can be advantageously used as a core material in the present invention include not only secondary aluminum ingots belonging to the second class (those having aluminum purities of 98% or higher) and the third class (those having aluminum purities of 97% or higher) enacted in JIS H2103, but also aluminum alloys containing impurities in relatively high contents which are obtained by regenerating scrap aluminum which was once used for printing and other purposes. Accordingly, materials of the present invention are superior to conventional materials from an economic point of view.

Core materials having stress resistances not higher than 15 kg/mm$^2$ do not increase the strengths of the resulting composite plates because their stress resistances are below those of the outer layer materials.

Furthermore, they tend to cause knicks during handling of the plates in the plate-making process. Therefore, these materials make workings difficult. In addition, these materials do not have mechanical strengths high enough to be supported by both ends of a rotating cylinder installed in a high speed offset rotary press. Therefore, a cut in the printing is caused by deformation at the fixed parts, or printing becomes impossible due to a breakdown of the plate. Consequently, these materials are ineligible as the core material of the present invention.

The stress resistance of 15 kg/mm$^2$ corresponds to that which can be acquired by the aluminum alloy having a purity of 99.0% when it receives a cold rolling process at a rolling rate of 75%. Obtaining stress resistances not lower than 15 kg/mm$^2$ can be easily acquired by heightening rolling rates or using aluminum alloys having purities of 99 to 95%. When core materials having stress resistances not lower than 20 kg/mm$^2$ are used, the resulting composite plates have markedly increased mechanical strength irrespective of the Fe content of the outer layer material. Even when the total thickness of the composite plate is reduced it can possess a mechanical strength higher than those of conventional ones. Therefore, the amount of aluminum alloy used as the core material can be reduced. The reduction of the amount used and the use of a low cost ingot are combined to contribute greatly to the reduction of manufacturing costs.

It is apparent from the above descriptions that the present invention realizes excellent printing characteristics, mechanical strength characteristics, and economical efficiency. This is accomplished by uniting an aluminum alloy plate having a distribution of finely crystallized intermetallic compounds as the outer layer with an inexpensive aluminum alloy rolled plate having sufficient mechanical strength.

Therefore, it should be understood that an aluminum alloy plate can be used for the outer layer which has excellent printing characteristics and sufficient mechanical strength by itself. If such a plate is used, there is no reason why a reinforcing aluminum alloy plate should be united with the base plate.

Processes for surface treating aluminum alloy plates of the present invention which are used as supports of lithographic printing plates are described in detail below.

Suitable examples of the graining process which can be applied to the present invention include an electrochemical graining process. In this process, graining is carried out in an electrolytic solution comprising hydrochloric acid or nitric acid by passing an electric current. Other useful processes include mechanical graining processes such as a wire brush graining process wherein aluminum surfaces are scratched with metal wire, a ball graining process wherein aluminum surface are rubbed with abrasive balls and abrasives, a nylon brush graining process wherein aluminum surfaces are rubbed with a nylon brush and abrasives, and so on. These graining processes may be employed independently or in combination.

After the graining process, the aluminum plate is subjected to chemical etching processing using an acid or an alkali. If an acid is used as the etching agent, it takes a very long time to destroy the fine structure. Accordingly, the use of acids as etching agents is disadvantageous when applying the present invention industrially. However, the disadvantage can be remedied by using an alkali as the etching agent.

Examples of the alkali agent which can be advantageously employed in the present invention include sodium hydroxide, sodium carbonate, sodium aluminate, sodium metasilicate, sodium phosphate, potassium hydroxide, lithium hydroxide and the like. Of these agents, sodium aluminate is preferred. A preferable concentration of such an alkali in the etching solution and a preferable temperature for the etching processing range from 1 to 50 wt % and from 20° to 100° C., respectively, so as to dissolve the aluminum in an amount of 5 to 20 g/m$^2$.

After the etching process, the aluminum plate is pickled with an acid in order to remove smut remaining on its surface. Acids which can be used for this purpose include nitric acid, sulfuric acid, phosphoric acid, chromic acid, hydrofluoric acid, borofluoric acid, and the like.

Upon the removal of smut, particularly after the electrochemical roughening treatment, a method as described in Japanese Patent Application (OPI) No. 12739/78, wherein the smut is removed by coming into contact with 15 to 65 wt % sulfuric acid warmed to 50° to 90° C., and the alkali etching method described in Japanese Patent Publication No. 28123/73, can be advantageously employed.

The thus-processed aluminum plates can be used as the supports for lithographic printing plates. Also, they can be further submitted to an anodic oxidation processing, a chemical processing or so on.

The anodic oxidation processing can be carried out using techniques which have so far been employed in the art. For example, an anodically oxidized film can be formed on the surface of an aluminum support by passing DC or AC current to the aluminum support in an aqueous or a nonaqueous solution containing sulfuric acid, phosphoric acid, chromic acid, oxalic acid, sulfamic acid, benzene-sulfonic acid, or a mixture of two or more of these acids.

Processing conditions of anodic oxidation are changed depending on what kind of electrolytic solution is used and, therefore, they cannot be determined indiscriminately. However, as a general guide, it can be said that an electrolytic solution having a concentration of 1 to 80 wt %, a solution temperature of 5° to 70° C., a current density of 0.5 to 60 ampere/dm$^2$, a voltage applied of 1 to 100 v and an electrolyzing time of 10 to 100 seconds can produce a preferable result.

Particularly effective anodically oxidized film processes are the processes used in British Patent No. 1,412,768, wherein anodic oxidation is carried out in sulfuric acid by sending a high density electric current, and the process described in U.S. Pat. No. 3,511,661, wherein anodic oxidation is carried out using phosphoric acid as an electrolytic bath.

The aluminum plate which has been anodically oxidized may be further treated with an aqueous solution of an alkali metal silicate such as sodium silicate or the like using a conventional technique, e.g., a dipping technique, as described in U.S. Pat. Nos. 2,714,066 and 3,181,461. Alternatively, a subbing layer made up of hydrophilic cellulose (e.g., carboxylmethyl cellulose, etc.) containing a water-soluble metal salt (e.g., zinc acetate, etc.) may be additionally provided on the anodically oxidized aluminum plate, as described in U.S. Pat. No. 3,860,426.

On the support for a lithographic printing plate which is prepared in accordance with an embodiment of the present invention, a light-sensitive layer which is known to have been used for PS plates is provided to produce a presensitized lithographic printing plate. The lithographic printing plate obtained by subjecting this PS plate to a plate making process has excellent properties.

Suitable examples of the composition of the above-described light-sensitive layer are described below.

(1) Light-sensitive layer comprised of a diazo resin and a binder.

Preferred examples of the diazo resin include those described in U.S. Pat. Nos. 2,063,631, 2,667,415, Japanese Patent Publication Nos. 48001/74, 45322/74, 45323/74, and British Patent No. 1,312,925. Preferred examples of the binder include those described in British Patents No. 1,350,521, 1,460,978, U.S. Pat. Nos. 4,123,276, 3,751,257, and 3,660,097.

(2) Light-sensitive layer comprised of an o-quinonediazide compound.

Particularly preferred examples include o-naphthoquinonediazide compounds as described in U.S. Pat. Nos. 2,766,118, 2,767,092, 2,772,972, 2,859,112, 2,907,665, 3,046,110, 3,046,111, 3,046,115, 3,046,118, 3,046,119, 3,046,120, 3,046,121, 3,046,122, 3,046,123, 3,061,430, 3,102,809, 3,106,465, 3,635,709 and 3,647,443, and many other publications.

(3) Light-sensitive layer comprises of a composition containing an azide compound and a binder (macromolecular compound.

Specific examples of the composition include compositions comprised of azide compounds and water-soluble or alkali-soluble macromolecular compounds which are described in British Patents No. 1,235,281 and 1,495,861, Japanese Patent Application (OPI) Nos. 32331/76 and 36128/76, and so on, and compositions comprised of azido group-containing polymers and macromolecular compounds as binders, as described in Japanese Patent Application (OPI) Nos. 5102/75, 84302/75, 84303/75 and 12984/78.

(4) Light-sensitive layers comprised of other light-sensitive resinous compositions.

Specific examples include the polyester compounds disclosed in U.S. Pat. No. 4,101,326, polyvinyl cinnamate series resins described in British Patents 1,112,277, 1,113,390, 1,341,004 and 1,377,747, and photopolymerizable photopolymer compositions described in U.S. Pat. Nos. 4,072,528 and 4,072,527 (incorporated herein by reference), and so on.

The amount (thickness) of the light-sensitive layer to be provided on the support is controlled to about 0.1 to about 7 g/m$^2$, preferably 0.5 to 4 g/m$^2$.

PS plates, after imagewise exposure, are subjected to processings including a developing step in a conventional manner to form resin images. For instance, a PS plate having the light-sensitive layer (1) constituted with a diazo resin and a binder has unexposed portions of the light-sensitive layer removed by development after imagewise exposure to produce a lithographic printing plate. However, a PS plate having a light-sensitive layer (2) has exposed portions of the light-sensitive layer which are removed by development with an alkaline aqueous solution after imagewise exposure to produce a lithographic printing plate.

The present invention will now be described in greater detail by reference to the following examples.

EXAMPLE 1

Alloys A to K having the compositions shown in Table 1 were quenched and solidified using a caster which enabled quenching with a rate of about 150° C./sec to produce 7 mm thick plates. These plates were cold rolled to produce 3 mm thick plates. These plates were subjected to intermediate annealing at 350°·C. for 1 hour and then to final cold rolling to produce 0.30 mm thick plates.

TABLE 1

| Alloy | Constituents (wt %) | | | | | | | | |
|---|---|---|---|---|---|---|---|---|---|
| | Fe | Si | Cu | Mn | Mg | Cr | Zn | Ti | Al |
| A | 0.10 | 0.09 | 0.002 | 0.009 | 0.004 | 0.01 | 0.007 | 0.025 | 99.75 |
| B | 0.13 | 0.09 | 0.003 | 0.007 | 0.003 | 0.01 | 0.006 | 0.023 | 99.70 |
| C | 0.17 | 0.10 | 0.001 | 0.008 | 0.005 | 0.02 | 0.008 | 0.024 | 99.66 |
| D | 0.20 | 0.11 | 0.001 | 0.007 | 0.004 | 0.01 | 0.008 | 0.021 | 99.64 |
| E | 0.25 | 0.10 | 0.001 | 0.007 | 0.005 | 0.01 | 0.009 | 0.02 | 99.60 |
| F | 0.39 | 0.13 | 0.02 | 0.006 | 0.002 | 0.01 | 0.01 | 0.02 | 99.42 |
| G | 0.55 | 0.13 | 0.05 | 0.01 | 0.02 | 0.02 | 0.01 | 0.01 | 99.21 |
| H | 1.10 | 0.14 | 0.03 | 0.01 | 0.02 | 0.01 | 0.01 | 0.01 | 98.66 |
| I | 1.32 | 0.12 | 0.02 | 0.006 | 0.005 | 0.01 | 0.01 | 0.02 | 98.50 |
| J | 0.39 | 0.20 | 0.02 | 0.006 | 0.002 | 0.02 | 0.01 | 0.03 | 99.32 |
| K | 0.55 | 0.16 | 0.11 | 0.01 | 0.01 | 0.01 | 0.01 | 0.01 | 99.13 |

Note:
A, B, and I to K ... Comparative examples
C to H ... Examples of the present invention Alloys L, M and N having the compositions shown in Table 2 were subjected to the conventional continuous casting not having the quenching effect to produce 350 mm thick ingots for rolling. The segregation layer of the surface was excluded by cutting and, thereafter, the ingots were hot rolled at 525° C. to produce 5 mm thick plates. These plates were cold rolled to produce 2 mm thick plates. These plates were subjected to intermediate annealing at 350° C. for 1 hour and then to final cold rolling to produce 0.30 mm thick plates.

TABLE 2

| Alloy | Constituents (wt %) | | | | | | | | |
|---|---|---|---|---|---|---|---|---|---|
| | Fe | Si | Cu | Mn | Mg | Cr | Zn | Ti | Al |
| L | 0.18 | 0.14 | 0.01 | 0.004 | 0.001 | 0.01 | 0.01 | 0.01 | 99.63 |
| M | 0.20 | 0.13 | 0.02 | 0.004 | 0.002 | 0.02 | 0.01 | 0.02 | 99.59 |
| N | 0.38 | 0.13 | 0.02 | 0.006 | 0.002 | 0.01 | 0.01 | 0.02 | 99.42 |

Note:
L to N ... Comparative examples

The mechanical properties of the above alloys A to N, and the sizes of the intermetallic compounds formed (maximum length of sliced intermetallic compound) are shown in Table 3.

TABLE 3

| Alloy | Stress Resistance (kg/mm$^2$) | Tensile Strength (kg/mm$^2$) | Elongation (%) | Maximum Length Sliced Intermetallic Compound (μ) |
|---|---|---|---|---|
| A | 16.5 | 17.7 | 5 | 1.0 |
| B | 16.7 | 18.0 | 4 | 1.0 |
| C | 17.0 | 18.5 | 3 | 1.2 |
| D | 17.4 | 18.7 | 3 | 1.4 |
| E | 17.6 | 18.8 | 3 | 1.6 |
| F | 18.0 | 19.4 | 3 | 2.0 |
| G | 19.6 | 21.4 | 2 | 2.0 |
| H | 20.7 | 22.8 | 2 | 2.5 |
| I | 21.5 | 23.7 | 2 | 4.0 |
| J | 18.2 | 20.0 | 2 | 2.5 |
| K | 15.6 | 17.2 | 2 | 4.5 |
| L | 14.5 | 15.6 | 2 | 3.8 |
| M | 14.4 | 15.7 | 2 | 4.0 |
| N | 15.0 | 16.2 | 2 | 5.5 |

These aluminum alloy rolled plates were grained in a suspension of pumice stone in water using a rotary nylon brush and then etched with a 20% aqueous solution of sodium hydroxide at 50° C. for 60 seconds so that the amount of aluminum dissolved was 8 g/m². The plates were thoroughly washed with flowing water, pickled with a 25% aqueous solution of nitric acids, and then washed with water to prepare base plates. These base plates were electrolyzed in an electrolyte containing 0.5 to 2.5% of nitric acid by passing therethrough an alternating electric current (current density: 20 A/dm² or more) in accordance with the procedure described in Japanese Patent Application (OPI) No. 146234/79. Subsequently the base plates were dipped in a 15% aqueous solution of sulfuric acid maintained at 50° C. for 3 minutes to clean the surface thereof and processed in an electrolyte containing sulfuric acid as a major component at a bath temperature of 30° C. to form an oxidized layer of 3 g/dm².

The following composition was coated on each base plate as prepared above in a dry amount of 2.5 g/m² to provide a light-sensitive layer.

|  | Amount (g) |
|---|---|
| Ester compound of naphthoquione-1,2-diazido-5-sulfonyl chloride with pyrogallol and acetone resin (described in Example 1 of U.S. Pat. No. 3,635,709) | 0.75 |
| Cresol novolak resin | 2.00 |
| Oil Blue #603 (produced by Orient Chemical Co., Ltd.) | 0.04 |
| Ethylene dichloride | 16 |
| 2-Methoxyethyl acetate | 12 |

The presensitized lithographic printing plates thus prepared were imagewise exposed for 60 seconds using a 3 kW metal halide lamp placed at a distance of 1 m, developed with an aqueous solution of sodium silicate having an $SiO_2/Na_2O$ molar ratio of 1.2 and an $SiO_2$ content of 1.5%, washed with water, and then dried. They were then subjected to a printing testing using an offset rotary press SYSTEM-C18 (manufactured by Komori Printing Machine Co., Ltd.). The results are shown in Table 4.

The printing durability was determined by the adhesion of the coating layer to the support, i.e., by measuring if the coating layer separated from the support, thereby producing unprinted areas in the printed matter, and was rated as follows:

○ ... Good
△ ... Slightly bad

Influence of Fe Content (Comparison of Alloys A to I)

In the printing plates using the supports of the present invention (Alloys C to H) in which the Fe content ranged between 0.15 and 1.2 wt %, any dot-form stains were not formed, the number of printed sheets up to the development of cracks in the plate exceeded 250,000, and the printing durability was good.

On the other hand, the printing plates using the comparative supports (Alloys A and B) in which the Fe content was less than 0.15 wt % was reduced in the number of printed sheets up to the development of cracks in the plate and was poor in the printing durability. Further, in the printing plate using the comparative support (Alloy I) in which the Fe content was more than 1.2 wt %, dot-form stains were formed and the printing durability was poor.

Influence of Impurities (Comparison of Alloys F, G, J and K)

Cu, Mn, Mg, Cr, Zn, Ti, etc. are generally contained as impurities, in addition to Si.

In the printing plates using the supports of the present invention (Alloys F and G) in which each content of impurities was 0.15 wt % or less (i.e., the Si content was 0.13 wt %), any dot-form stains were not formed, the number of printed sheets up to the development of cracks in the plate exceeded 250,000, and the printing durability was good.

On the other hand, in the printing plates using the comparative supports (Alloys J and K) in which the Fe content was the same as those of Alloys F and G, but the Si content exceeded 0.15 wt %, stains were formed and the printing durability was poor.

Influence of Maximum Length of Sliced Intermetallic Compound (Comparison of Alloys C, D, F, L, M and N)

In the printing plate using the supports of the present invention [Alloys C, D and F), in which the maximum length was 3 m$\mu$ or less, any dot-form stains were not formed, the number of printed sheets up to the development of cracks in the plate exceeded 250,000, and the printing durability was good.

TABLE 4

| Alloy | Maximum Length of Sliced Intermetalic Compound ($\mu$) | Dot Form Stain Occurence (number/25 cm²) | Number of Printed Sheets up to the Development of Cracks ($\times 10^4$) | Printing Durability |
|---|---|---|---|---|
| A | 1.0 | 0 | 23 | △ |
| B | 1.0 | 0 | 23 | △ |
| C | 1.2 | 0 | >25 | △~○ |
| D | 1.4 | 0 | >25 | △~○ |
| E | 1.6 | 0 | >25 | ○ |
| F | 2.0 | 0 | >25 | ○ |
| G | 2.0 | 0 | >25 | ○ |
| H | 2.5 | 0 | >25 | △~○ |
| I | 4.0 | 15 | >25 | △ |
| J | 2.5 | 5 | >25 | △ |
| K | 5.2 | 15 | 20 | △ |
| L | 3.8 | 17 | 16 | △ |
| M | 4.0 | 20 | 17 | △ |
| N | 5.5 | 25 | 18 | △ |

Note:
A to C ... Comparative Examples
C to H ... Examples of the Invention
I to M ... Comparative Examples On the other hand, in all the printing plates using the comparative supports (Alloys L, M, N), in which the maximum length was more than 3 mμ, dot-form stains were formed, cracks were easily developed in the plate, and the printing durability was poor.

As a result of extensive investigations on the printing durability, it has been found that the printing durability tends to be reduced as the Fe content is decreased and also as it is excessively increased. The reason for this is believed that in the preparation of the support, satisfactory roughening cannot be achieved by etching and the support has only an unsuitable roughened surface, resulting in a reduction of the adhesion of the coating layer to the support. In order to obtain an excellent printing durability, it is preferred that the Fe content be controlled within the range of 2.2 to 1.0 wt %.

EXAMPLE 2

In this example, the desired support was produced by integrally combining an outer layer material and a core material.

Alloys P, Q, R, S, T, and U having the compositions shown in Table 5 were quenched and solidified using a casting machine enabled quenching with a rate of about 100° C./second to prepare 15 mm thick plates. These plates were used as outer layer materials.

Alloys V, W, and X having the compositions shown in Table 5 were continuously cast by the conventional procedure to produce 350 mm thick ingots for rolling. After cutting away the surface, the resulting plates were used as core materials.

These outer layer and core materials were preliminarily bonded together in the following combinations: P-V, Q-V, R-W, S-X, T-W, and U-W.

In these composite materials, the thickness of the outer layer material was 15 mm and that of the core material was 340 mm. Alloy V was a regenerated aluminum alloy which had not been subjected to special adjustment in composition.

The composite materials thus prepared were hot rolled at 480° C. to produce 5 mm thick composite plates in which the outer layer and core materials were completely joined together. These composite plates were cold rolled to produce 2.0 mm thick composite plates. These plates were subjected to intermediate annealing at 350° C. for 1 hour and then to final cold rolling to produce 0.30 mm thick plates.

The plates using the combinations of Q-V, R-W, and S-X were examples of the present invention, and those using the combinations of P-V, T-W, and U-W were comparative examples.

TABLE 5

| Alloy | Fe | Si | Cu | Mn | Mg | Cr | Zn | Ti | Al | Use |
|---|---|---|---|---|---|---|---|---|---|---|
| P | 0.12 | 0.10 | 0.003 | 0.005 | 0.005 | 0.01 | 0.01 | 0.02 | 99.73 | Surface layer material |
| Q | 0.17 | 0.11 | 0.002 | 0.006 | 0.005 | 0.01 | 0.02 | 0.02 | 99.65 | Surface layer material |
| R | 0.24 | 0.12 | 0.005 | 0.005 | 0.006 | 0.01 | 0.01 | 0.03 | 99.57 | Surface layer material |
| S | 0.57 | 0.14 | 0.04 | 0.01 | 0.02 | 0.01 | 0.02 | 0.03 | 99.16 | Surface layer material |
| T | 1.28 | 0.13 | 0.02 | 0.01 | 0.01 | 0.02 | 0.03 | 0.04 | 98.46 | Surface layer material |
| U | 0.41 | 0.20 | 0.02 | 0.01 | 0.01 | 0.02 | 0.01 | 0.03 | 99.29 | Surface layer material |
| V | 0.76 | 0.54 | 0.05 | 0.02 | 0.03 | 0.01 | 0.01 | 0.16 | 98.42 | Core material |
| W | 0.47 | 0.18 | 0.14 | 1.02 | 1.15 | 0.02 | 0.01 | 0.04 | 96.97 | Core material |
| X | 0.39 | 0.16 | 0.15 | 1.00 | 1.12 | 0.02 | 0.01 | 0.03 | 97.12 | Core material |

The above plates were grained in a suspension of pumice stone in water using a rotary nylon brush in the same manner as in Example 1 and then etched with a 20% aqueous solution of sodium hydroxide at 50° C. for 60 seconds so that the amount of aluminum dissolved was 3 g/m². The plates were thoroughly washed with flowing water, pickled with a 25% aqueous solution of nitric acid, and then washed with water to prepare base plates. These base plates were electrolyzed in an electrolyte containing 20% of sulfuric acid as a major component at a bath temperature of 30° C. to form an oxidized layer of 3 g/m².

The same composition as used in Example 1 was coated on each base plate as prepared above in a dry amount of 25 g/m², which was then processed in the same manner as in Example 1 to prepare a printing plate. The printing plates thus produced were subjected to a printing testing using the same offset rotary press. The results are shown in Table 6.

TABLE 6

| Alloy | Stress Resistance (kg/mm²) | Tensile Strength (kg/mm²) | Elongation (%) | Maximum Length of Sliced Intermetallic Compound (μ) | Number of Dot-Form Stains (per 25 cm²) | Number of Printed Sheets up to the Development of Cracks (× 10⁴) | Printing Durability |
|---|---|---|---|---|---|---|---|
| Q-V | 17.2 | 19.0 | 3 | 1.3 | 0 | >25 | Δ~o |
| R-W | 26.2 | 27.1 | 3 | 1.6 | 0 | >25 | o |
| S-X | 26.4 | 27.5 | 2 | 2.1 | 0 | >25 | o |
| P-V | 17.3 | 18.8 | 3 | 1.0 | 0 | >25 | Δ |
| T-W | 27.4 | 28.5 | 2 | 3.8 | 10 | >25 | Δ |
| U-W | 26.5 | 27.4 | 2 | 2.5 | 7 | >25 | Δ |

Q-V, R-W, and S-X . . . Examples of the present invention
P-V, T-W, and U-W . . . Comparative examples In the printing plates using the combinations of the present invention (Q-V, R-W, and S-X), any dot-form stains were not formed, the number of printed sheets up to the development of cracks in the plate was more than 250,000, and the printing durability was good.

On the other hand, in the printing plates using the comparative combinations: P-V in which the Fe content of the outer layer material was less than 0.15 wt %, T-W in which the Fe content was more than 1.2 wt %, and U-W in which the impurity Si content was more than 0.15 wt %, the printing durability was poor and dot-form stains were sometimes formed.

Of the printing plates using the combinations of the present invention, the printing plates using the outer layer containing 0.22 wt % or more of Fe showed more excellent printing durability.

EXAMPLE 3

Alloys Y-1, Y-2, and Y-3 having the compositions shown in Table 7 were quenched and solidified using a casting machine which enabled quenching with a rate of about 150° C./sec and to prepare 7 mm thick plates. These plates were cold rolled to produce 3 mm thick plates. These plates were subjected to intermediate annealing at 350 °C. for 1 hour and then to final cold rolling to produce 0.30 mm thick plates. These plates were referred to as materials of the invention, (4), (5), and (6), respectively.

Alloy Z having the composition shown in Table 7 was subjected to the conventional continuous casting not having the quenching effect to produce an ingot for rolling. After the removal of the surface segregation layer, the ingot was cut to a thickness of 460 mm. This plate was hot rolled at 525° C. to a thickness of 5 mm and cold rolled to a thickness of 2 mm and, thereafter, was subjected to intermediate annealing at 350° C. for 1 hour and then to final cold rolling to produce a 0.30 mm thick plate. This plate was referred to as a comparative material (5).

TABLE 7

| Alloy | Fe | Si | Cu | Mn | Mg | Cr | Zn | Ti | Al |
|---|---|---|---|---|---|---|---|---|---|
| Y-1 | 0.33 | 0.11 | 0.01 | 0.01 | 0.01 | 0.01 | 0.01 | 0.02 | 99.54 |
| Y-2 | 0.55 | 0.13 | 0.05 | 0.01 | 0.02 | 0.01 | 0.01 | 0.01 | 99.21 |
| Y-3 | 1.11 | 0.14 | 0.03 | 0.01 | 0.02 | 0.01 | 0.01 | 0.01 | 98.66 |
| Y-4 | 0.30 | 0.14 | 0.02 | 0.007 | 0.002 | 0.01 | 0.01 | 0.02 | 99.49 |

The plates were processed in the same manner as in Example 1 to produce printing plates. These printing plates were subjected to a printing testing using the same offset rotary press as used in Example 1. The results are shown in Table 8. It can be seen from Table 8 that in the printing plates using the materials of the invention, (4), (5), and (6), any dot-form stains were not formed.

TABLE 8

| Material | Alloy | Stress Resistance (kg/mm²) | Tensile Strength (kg/mm²) | Elongation (%) | Maximum Length of Sliced Intermetallic Compound (μ) | Number of Dot-Form Stains (per 25 cm²) |
|---|---|---|---|---|---|---|
| (4) | Y-1 | 17.0 | 18.9 | 2 | 1.5 | None |
| (5) | Y-2 | 19.6 | 21.4 | 2 | 2.0 | " |
| (6) | Y-3 | 20.7 | 22.8 | 2 | 2.5 | " |
| Comparative Material | | | | | | |
| (5) | Z | 14.5 | 16.1 | 2 | 5.0 | 15 |

While the invention has been described in detail and with reference to specific embodiments thereof, it will be apparent to one skilled in the art that various changes and modification can be made therein without departing from the spirit and scope thereof.

What is claimed is:

1. An aluminum alloy support for a lithographic printing plate, comprising a cold rolled plate of aluminum alloy comprising, in % by weight:
   98.0% or more Al;
   Fe in an amount of from 0.15 to 1.2% as an alloying element;
   Si in an amount of from greater than 0.0% but less than or equal to 0.15%; and
   impurities, each of which is present in an amount of from 0.0% but less than or equal to 0.15%,
   wherein the cold rolled plate has a distribution of Al—Fe and Al—Fe—Si based intermetallic compounds formed from the alloy, having grain sizes of greater than 0 microns but less than or equal to 3 microns, which are positioned directly under an outer surface of the cold rolled plate and wherein the surface of the cold rolled plate is roughened by chemical etching or electrochemical etching and anodically oxidized.

2. The aluminum alloy support as in claim 1, wherein the amount of Fe is from 0.22 to 1.2% by weight.

3. A composite alloy support for a lithographic printing plate, comprising:
   (1) an outer layer, and
   (2) a core material united thereto, wherein said outer layer (2) comprises a cold rolled plate of an aluminum alloy comprising, in % by weight:
   98.0% or more Al;
   Fe in an amount of from 0.15 to 1.2% as an alloying element;
   Si in an amount of from greater than 0.0% but less than or equal to 0.15%; and
   impurities, each of which is present in an amount of from 0.0% but less than or equal to 0.15%,
   wherein said outer layer (1) has a thickness of 10 microns or more and has a distribution of Al—Fe and Al—Fe—Si based intermetallic compounds formed from the alloy, having grain sizes of greater than 0 microns but less than or equal to 3 microns, which are positioned directly under the outer layer and wherein the surface of the outer layer is roughened by chemical etching or electrochemical etching and anodically oxidized; and said core material (2) comprises an aluminum alloy having a stress resistance of 15 kg/cm² or more.

4. The composite alloy support as in claim 3, wherein the amount of Fe is from 0.22 to 1.2% by weight.

5. The composite alloy support as in claim 3, wherein the aluminum alloy plate as the outer layer has a thickness of from 10 to 100 μm.

6. The composite alloy support as in claim 4, wherein the aluminum alloy plate as the outer layer has a thickness of from 10 to 100 μm.

* * * * *